(12) United States Patent
Yamane et al.

(10) Patent No.: US 11,110,541 B2
(45) Date of Patent: Sep. 7, 2021

(54) ULTRASONIC BONDING MACHINE

(71) Applicant: KEYLEX CORPORATION, Hiroshima (JP)

(72) Inventors: Toshimasa Yamane, Hiroshima (JP); Kazunari Uehara, Hiroshima (JP)

(73) Assignee: KEYLEX CORPORATION, Hiroshima (JP)

( * ) Notice: Subject to any disclaimer, the term of this patent is extended or adjusted under 35 U.S.C. 154(b) by 339 days.

(21) Appl. No.: 16/349,560

(22) PCT Filed: Jun. 23, 2017

(86) PCT No.: PCT/JP2017/023299
§ 371 (c)(1),
(2) Date: May 13, 2019

(87) PCT Pub. No.: WO2018/087954
PCT Pub. Date: May 17, 2018

(65) Prior Publication Data
US 2020/0189024 A1 Jun. 18, 2020

(30) Foreign Application Priority Data

Nov. 14, 2016 (JP) .............................. JP2016-221700

(51) Int. Cl.
*B23K 20/10* (2006.01)
*B29C 65/08* (2006.01)
*B23K 101/36* (2006.01)

(52) U.S. Cl.
CPC .............. *B23K 20/10* (2013.01); *B29C 65/08* (2013.01); *B23K 2101/36* (2018.08)

(58) Field of Classification Search
CPC ........ B23K 20/10–106; B23K 2101/36; B23K 1/06; B29C 65/08
(Continued)

(56) References Cited

U.S. PATENT DOCUMENTS

| 4,044,174 A | * | 8/1977 | Carr | ....................... | G11B 5/633 |
| | | | | | 427/130 |
| 6,897,161 B2 | * | 5/2005 | Suzuki | ..................... | B08B 3/12 |
| | | | | | 134/1.3 |

(Continued)

FOREIGN PATENT DOCUMENTS

| GB | 2271731 A | 4/1994 |
| JP | H06-190706 A | 7/1994 |

(Continued)

OTHER PUBLICATIONS

International Searching Authority, International Search Report and Written Opinion for International Application No. PCT/JP2017/023299, dated Aug. 29, 2017, 10 pages, Japanese Patent Office, Japan.

*Primary Examiner* — Kiley S Stoner
(74) *Attorney, Agent, or Firm* — Alston & Bird LLP (57) ABSTRACT

Two aluminum alloy plates are sandwiched between an anvil and a chip of a horn which is being vibrated by a vibration unit, to perform ultrasonic bonding. A deposit removing unit is provided above the horn. When the horn is vibrated by the vibration unit and raised by an elevator, the chip positioned on the top of the horn comes into contact with a removal section, with the chip being vibrated, to allow the removal section to remove a deposit adhering to the chip.

7 Claims, 5 Drawing Sheets

(58) Field of Classification Search
USPC .............. 228/110.1, 1.1; 156/73.1–73.5
See application file for complete search history.

(56) References Cited

U.S. PATENT DOCUMENTS

| | | | |
|---|---|---|---|
| 2002/0121292 A1* | 9/2002 | Betrabet | B29C 66/83413 134/34 |
| 2007/0119905 A1 | 5/2007 | Higashi et al. | |
| 2010/0006231 A1 | 1/2010 | Masuda et al. | |
| 2013/0056025 A1* | 3/2013 | Widhalm | B08B 1/00 134/6 |
| 2014/0138012 A1* | 5/2014 | Spicer | B23K 20/26 156/64 |

FOREIGN PATENT DOCUMENTS

| | | | |
|---|---|---|---|
| JP | 09022505 A | * | 1/1997 |
| JP | 10321567 A | * | 12/1998 |
| JP | 2000-091385 A | | 3/2000 |
| JP | 2000-218484 A | | 8/2000 |
| JP | 2003-197684 A | | 7/2003 |
| JP | 2006-156970 A | | 6/2006 |
| JP | 2006-278627 A | | 10/2006 |
| JP | 2008-142738 A | | 6/2008 |
| JP | 2009-241120 A | | 10/2009 |
| JP | 2009-279657 A | | 12/2009 |
| WO | WO-2008/126213 A1 | | 10/2008 |

\* cited by examiner

ULTRASONIC BONDING MACHINE

CROSS REFERENCE TO RELATED APPLICATIONS

This application is a national stage continuing application, filed under 35 U.S.C. § 371, of International Application No. PCT/JP2017/023299, filed Jun. 23, 2017, which International Application claims priority to and the benefit of Japanese Application No. 2016-221700, filed Nov. 14, 2016; the contents of both of which as are hereby incorporated by reference in their entirety.

BACKGROUND

Technical Field

The present disclosure relates to an ultrasonic bonding machine configured to bond two bonding targets, which are stacked one above the other, by ultrasonic vibrations.

Description of Related Art

A typical ultrasonic bonding machine disclosed, for example, in Japanese Unexamined Patent Publication No. 2008-142738 (Patent Document 1) includes a horn including, to the bottom of which a bonding chip is attached, and an anvil provided below the horn. Two panel bonding targets, which are made of a metal material, can be placed on the anvil, while overlapping each other. The horn being horizontally vibrated is lowered so that the anvil and the vibrating chip sandwich, and ultrasonically bond, the two targets.

BRIEF SUMMARY

Ultrasonic bonding machines, such as one disclosed in Patent Document 1, may cause, if used repeatedly, a phenomenon in which part of the bonding targets is ground into particles, and the particles adhere to the surface of the chip. If further ultrasonic bonding is performed with the particles adhering to the surface of the chip, the bonding targets may be fixed to the chip in the worst case. Periodical polishing of the chip surface is thus necessary to keep the chip surface in proper condition.

To address this, for example, it is conceivable to place a chip polishing machine on a side of the ultrasonic bonding machine, and to periodically polish the chip surface with the chip polishing machine.

However, the placement of the chip polishing machine on the side of the ultrasonic bonding machine requires an additional installation space for the chip polishing machine on the side of the ultrasonic bonding machine, as well as an additional mechanism for moving the chip from the ultrasonic bonding machine to the chip polishing machine and an additional mechanism for vibrating the chip for the polish. A large site is thus needed to install the machine, and the installation costs increase.

It is therefore an object of the present disclosure to provide a compact and low-cost ultrasonic bonding machine capable of preventing or reducing fixture of bonding targets to a chip.

In order to achieve the above object, the present disclosure provides a unique configuration that enables the polishing of a chip at a position above a horn.

Specifically, the present disclosure is directed to an ultrasonic bonding machine including: a horn provided with a chip for bonding located at a bottom of the horn; a vibrator which horizontally vibrates the horn; an elevator which raises and lowers the horn; and an anvil arranged below the horn and allowing two bonding targets to be placed thereon, while the two bonding targets overlapping each other, the vibrator vibrating the horn, and the elevator lowering the horn, so that the anvil and the vibrating chip sandwich, and ultrasonically bond, the bonding targets. The present disclosure provides the following solution.

Specifically, in a first aspect of the disclosure, the machine further includes a chip position changer capable of changing a position of the chip to a position at a top of the horn, a deposit remover is provided above the horn, and when the horn is vibrated by the vibrator and raised by the elevator, the chip, which has been positioned at the top of the horn by the chip position changer, comes into contact with the deposit remover, with the chip being vibrated, to allow the deposit remover to remove a deposit adhering to the chip.

A second aspect of the present disclosure is an embodiment of the first aspect. In the second aspect, the chip position changer is a rotary motor which rotates the horn about a center line of the horn extending horizontally.

A third aspect of the present disclosure is an embodiment of the second aspect. In the third aspect, the chip includes a plurality of chips arranged at regular intervals around the center line of the horn.

A fourth aspect of the present disclosure is an embodiment of the third aspect. In the fourth aspect, an even number of the chips are provided around the center line of the horn.

A fifth aspect of the present invention is an embodiment of any one of the first to fourth aspects. In the fifth aspect, the ultrasonic bonding machine further includes: a deposit removing member including a removal section which removes the deposit adhering to the chip; a slide member which is placed above the removal section so as to be in contact with the removal section and which is vertically slidable; and a biasing member which biases the slide member downward.

A sixth aspect of the present disclosure is an embodiment of the fifth aspect. In the sixth aspect, a drive roller having a horizontally extending rotation axis is provided above the biasing member, and the deposit removing member is an endless belt wound around the drive roller and the slide member so as to be circularly movable.

The first aspect of the present disclosure allows the deposit remover capable of removing a deposit to periodically polish the chip surfaces, and thereby reliably preventing or reducing the fixture of the bonding targets to the chip in the ultrasonic bonding. Further, since the deposit remover is located above the horn, the entire ultrasonic bonding machine has a smaller horizontal size, thereby requiring no large site for installation. Further, the chip can be moved to a polishing position, where the surface of the chip is polished, by utilizing the upward movement of the elevator used during ultrasonic bonding, and the surface of the chip can be polished by utilizing the vibrations of the vibrator used during ultrasonic bonding. It is therefore not necessary to provide additional mechanisms intended for movement and polishing of the chip in polishing the surface of the chip. That is, no additional cost is required to polish the surface of the chip.

According to the second aspect of the present disclosure, the position of the chip is changed without vertically changing the position of the horn. Thus, the ultrasonic bonding machine requires only a small vertical size.

According to the third aspect of the present disclosure, In replacing the chip having deposits on its surface with another chip not yet having deposits on its surface, no complicated operation is needed, such as attachment/detachment of the chip to/from the horn by an operator. That is, the chip is easily replaced.

In the fourth aspect of the disclosure, one of the chips is located at the bottom of the horn, and one of the rest of the chips is located at the top of the horn. Ultrasonic bonding is carried out using the chip located at the bottom of the horn lowered by the elevator while being vibrated by the vibrator. Polishing is carried out thereafter with respect to the chip located at the top of the horn raised by the elevator while being vibrated by the vibrator. This configuration allows efficient bonding and polishing.

According to the fifth aspect of the present disclosure, when the elevator raises the horn, and the chip located at the top of the horn comes into contact with the deposit removing member, the slide member slides upward against the biasing force of the biasing member, with the deposit removing member kept in contact with the surface of the chip due to the biasing force of the biasing member. This configuration can reduce an impact when the chip comes into contact with the deposit remover, and hence can reduce malfunctions of the ultrasonic bonding machine.

According to the sixth aspect of the present disclosure, after polishing the surface of the chip, the drive roller is actuated to move the deposit removing member by a predetermined amount between the drive roller and the slide member. As a result, a new region of the deposit removing member which has not yet undergone the polishing process is positioned below the slide member. This configuration allow each chip to be polished with the deposit removing member in a region having a good surface condition, which makes it possible to reliably remove deposits adhering to the surface of the chip.

DETAILED DESCRIPTION OF VARIOUS EMBODIMENTS

An embodiment of the present disclosure will now be described in detail with reference to the drawings. Note that the following description of an embodiment is merely illustrative in nature.

Figure 1:
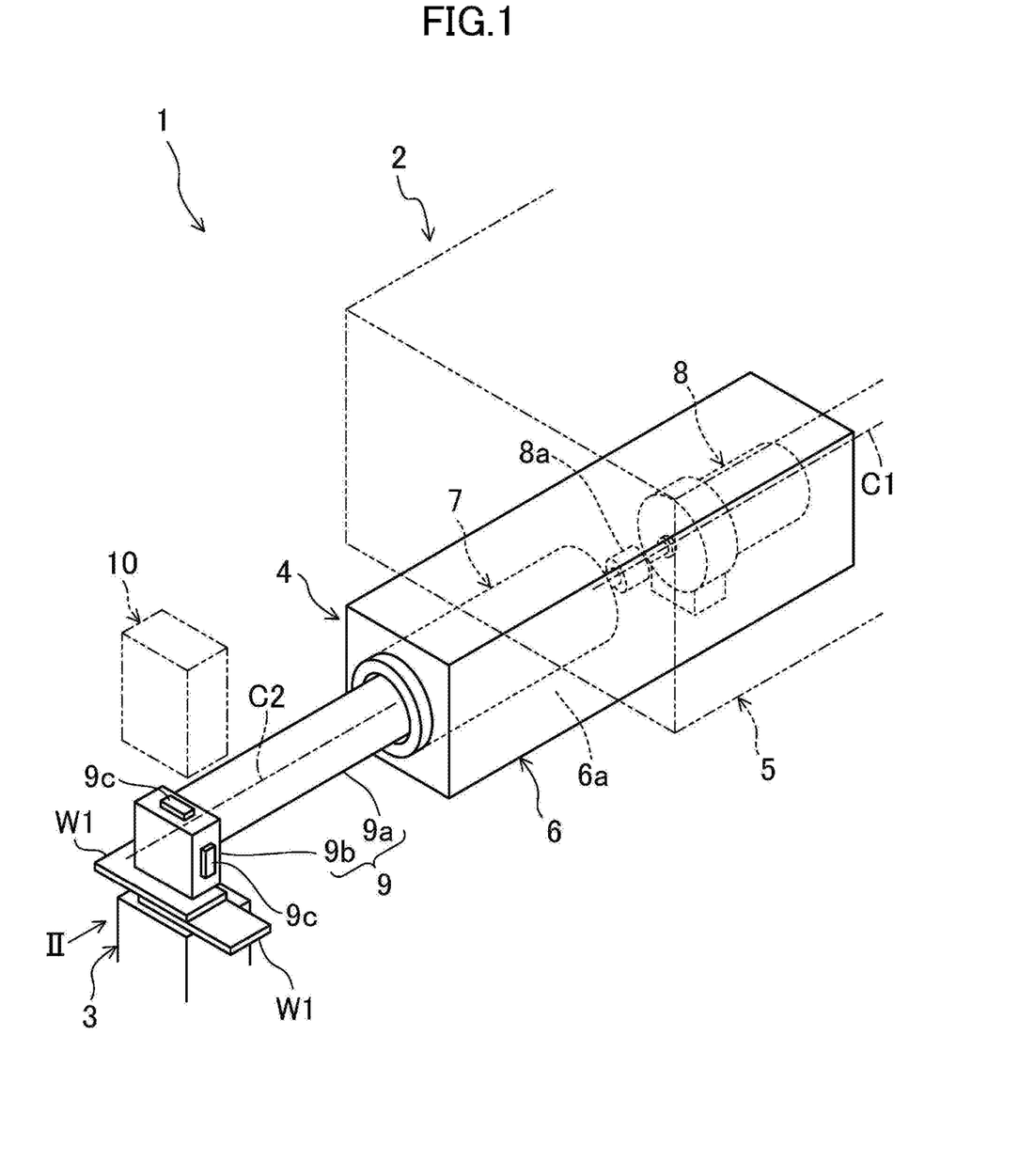
FIG. 1 is a diagram illustrating a perspective view of an ultrasonic bonding machine according to an embodiment of the present disclosure.

FIG. 1 shows an ultrasonic bonding machine 1 according to an embodiment of the present disclosure. The ultrasonic bonding machine 1 integrates two aluminum alloy plates W1 (i.e., bonding targets), which are overlapped with each other, by ultrasonic bonding. The ultrasonic bonding machine 1 includes a machine body 2 installed on a floor, and an anvil 3 which is arranged on a side of the machine body 2. The two aluminum alloy plates W1 can be placed on the anvil 3, while overlapping each other.

The machine body 2 includes a processing unit 4 extending horizontally toward a position above the anvil 3, and an elevator 5 for raising and lowering the processing unit 4. The anvil 3 is located below the protruding end of the processing unit 4.

The processing unit 4 includes an elongated substantially rectangular parallelepiped housing case 6 having a housing space 6a inside. The housing space 6a houses a substantially cylindrical vibration unit (i.e., vibrator) 7, and a rotary motor (i.e., chip position changer) 8.

The vibration unit 7 has a cylinder center line C1 extending along the length of the processing unit 4. One end of the vibration unit 7 faces outside the housing case 6.

The rotary motor 8 is placed near the other end of the vibration unit 7, and has a rotary shaft 8a that is located on the cylinder center line C1 of the vibration unit 7 and protrudes toward the inside of the vibration unit 7.

A horn 9 is provided at the one end of the vibration unit 7. The horn 9 has a center line C2 that coincides with the cylinder center line C1 of the vibration unit 7.

The horn 9 includes a horn body 9a that is an elongated round bar, and a processing head 9b that is a thick square plate attached to one end of the horn body 9a. The other end of the horn body 9a is inserted and fitted in the vibration unit 7.

The other end of the horn body 9a is coupled to the rotary shaft 8a of the rotary motor 8. The horn 9 is rotatable about the center line C2 in accordance with the rotation of the rotary shaft 8a of the rotary motor 8.

Further, the other end of the horn body 9a is connected to a vibration mechanism (not shown) provided inside the vibration unit 7. The horn 9 is capable of being vibrated by the vibration unit 7 in the horizontal directions orthogonal to the center line C2 (i.e., in the directions of arrows X1 shown in FIGS. 3 and 5).

Figure 4:
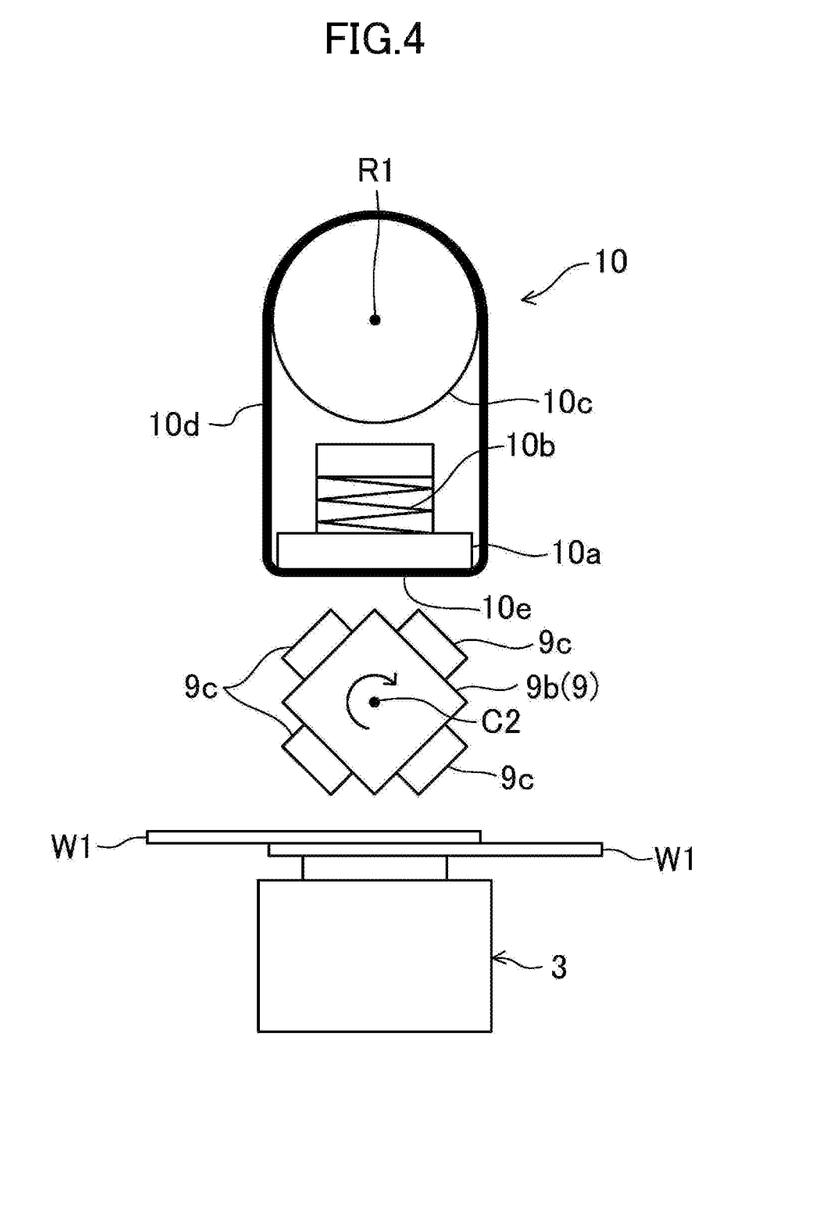
FIG. 4 a diagram illustrating a state in which a horn is rotated about its center line after the state of FIG. 3.

The processing head 9b is provided with four rectangular plate-shaped chips 9c intended for bonding at regular intervals around the center line C2. As shown in FIG. 4, the rotation of the horn 9, caused by the rotary motor 8, causes one of the chips 9c to be located at the top of the horn 9, and another chip 9c to be located at the bottom of the horn 9, one after another.

Figure 2:
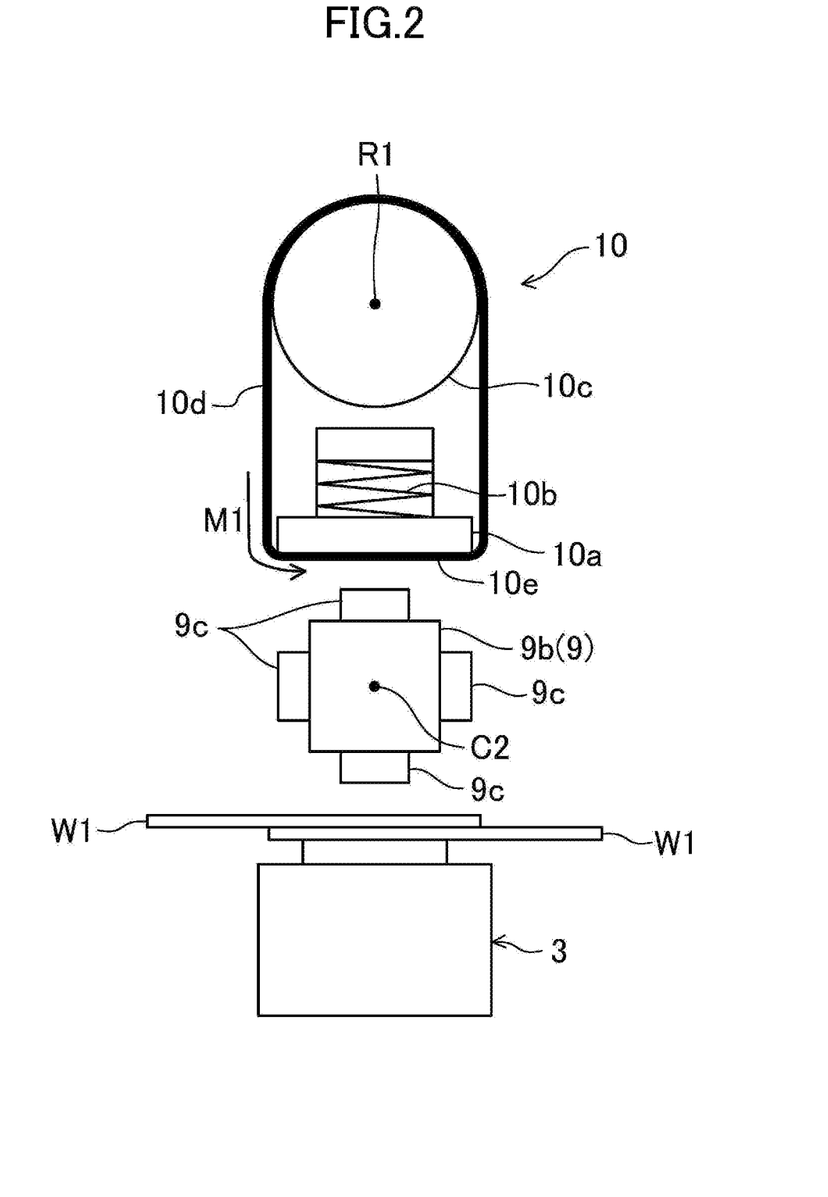
FIG. 2 is a diagram illustrating a view along the arrow II of FIG. 1.
Figure 3:
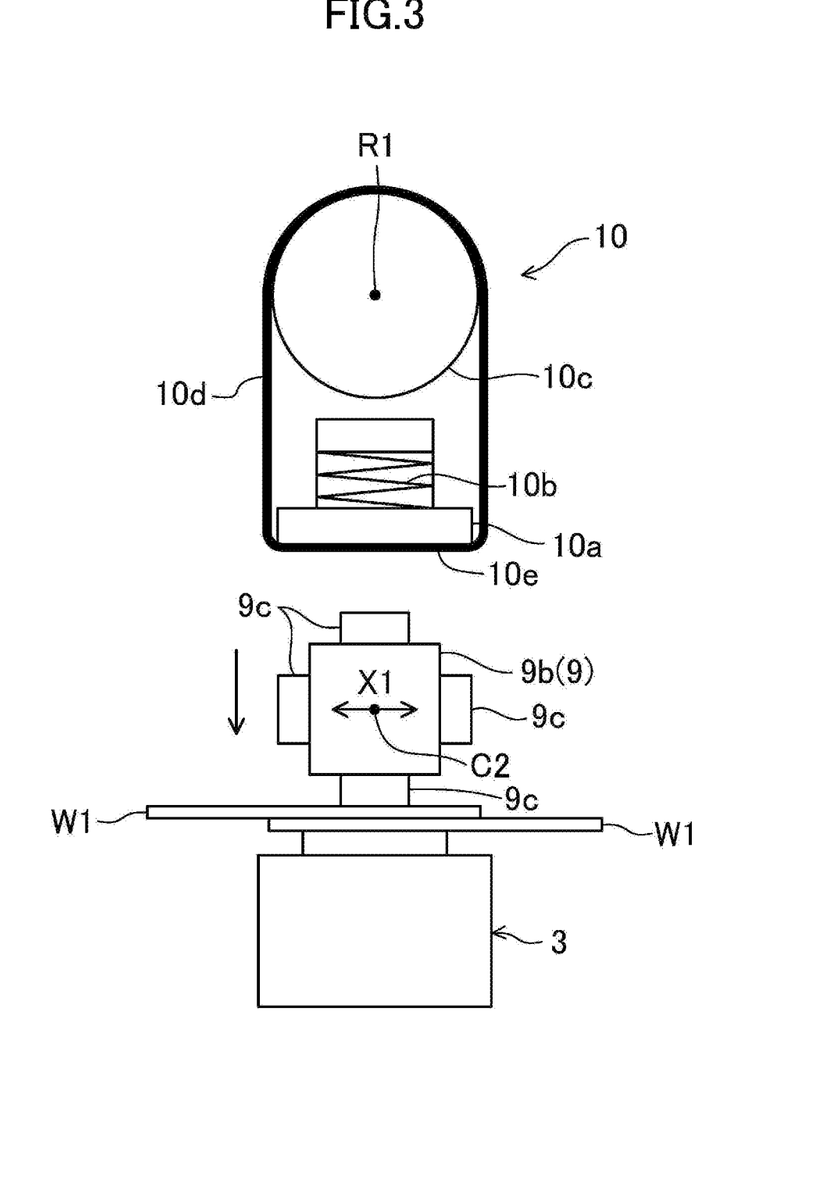
FIG. 3 a diagram illustrating a state during ultrasonic bonding after the state of FIG. 2.

As shown in FIGS. 2 and 3, the ultrasonic bonding machine 1 is configured to cause the horn 9 to vibrate by the vibration unit 7 and lower the horn 9 by the elevator 5 so that the two aluminum alloy plates W1, overlapping each other on the anvil 3, are sandwiched between the anvil 3 and the vibrating chip 9c located at the bottom of the horn 9, thereby achieving ultrasonic bonding.

A deposit removing unit (i.e., deposit remover) 10 is provided above the protruding end of the processing unit 4. The deposit removing unit 10 is capable of removing deposits adhering to the chips 9c.

As shown in FIG. 2, the deposit removing unit 10 includes a slide member 10a, a coil spring (i.e., biasing member) 10b, a drive roller 10c arranged above the coil spring 10b, and a copper belt (i.e., deposit removing member) 10d. The slide member 10a has a rectangular plate-like shape in plan view, and is vertically slidable. The coil spring 10b biases the slide member 10a downward. The drive roller 10c has a rotation axis R1 extending in the same direction as the cylinder center line C1. The copper belt 10d is an endless belt wound around the slide member 10a and the drive roller 10c so as to be circularly movable. A region of the copper belt 10d, which is in contact with the lower surface of the slide member 10a, serves as a removal section 10e of the present disclosure.

Figure 5:
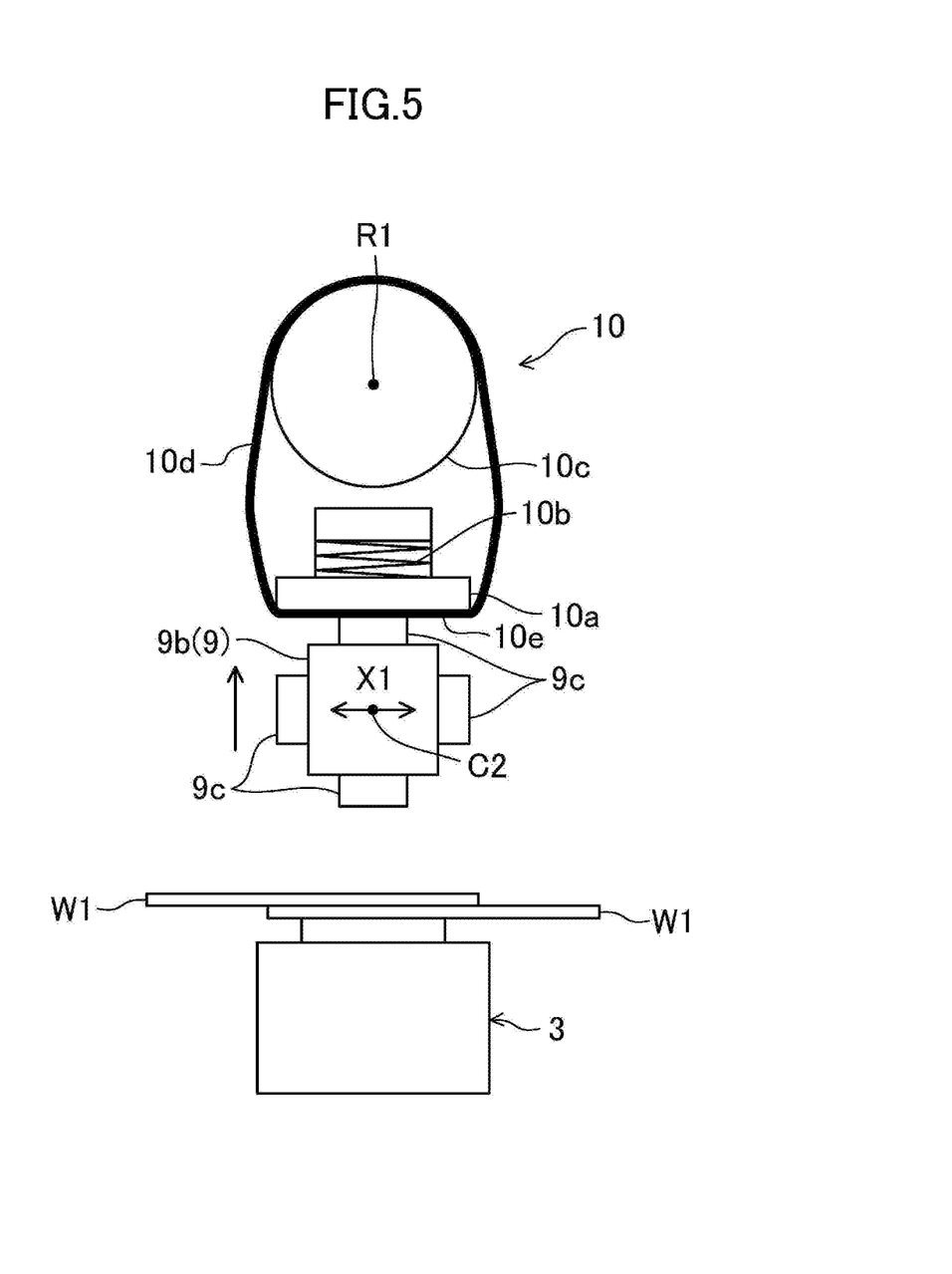
FIG. 5 a diagram illustrating a state in which a deposit adhering to a surface of a chip is removed after the state of FIG. 4.

As shown in FIG. 5, the ultrasonic bonding machine 1 is configured such that when the horn 9 is vibrated by the vibration unit 7 and the horn 9 is raised by the elevator 5, one of the vibrating chips 9c which is located at the top of the horn 9 comes into contact with the removal section 10e of the copper belt 10d, causing the slide member 10a to slide upward against the biasing force of the coil spring 10b.

Since the vibrating chip 9c, which is located at the top of the horn 9, comes into contact with the removal section 10e of the copper belt 10d, deposits adhering to the vibrating chip 9c are removed by the removal section 10e.

Now, an ultrasonic bonding operation using the ultrasonic bonding machine 1 according to the embodiment of the present disclosure will be described in detail.

First, as shown in FIG. 2, two unbonded aluminum alloy plates W1 are placed on the anvil 3 so as to overlap with each other by an industrial robot (not shown).

The ultrasonic bonding machine 1 is actuated after the placement of the aluminum alloy plates W1 on the anvil 3 by the industrial robot. The vibration unit 7 starts vibrating the horn 9, and the elevator 5 starts lowering the horn 9.

Meanwhile, as shown in FIG. 3, one of the vibrating chips 9c which is located at the bottom of the processing head 9b of the horn 9 comes into contact with the upper surface of the upper aluminum alloy plate W1 placed on the anvil 3, so that the aluminum alloy plates W1 are sandwiched and pressed between the anvil 3 and the vibrating chip 9c. A solid-phase bonding portion (not shown) is therefore formed between the aluminum alloy plates W1, which are integrated together as a result.

After the completion of the ultrasonic bonding of the aluminum alloy plates W1, the elevator 5 raises the horn 9 until the horn 9 is located in between the deposit removing unit 10 and the anvil 3, where the horn 9 is stopped.

After that, as shown in FIG. 4, the horn 9 is rotated about the center line C2 by the rotational movement of the rotary shaft 8a of the rotary motor 8, so that the chip 9c located at the top of the horn 9 is changed to the next chip 9c in the circumferential direction about the center line C2, and that the chip 9c located at the bottom of the horn 9 is changed to the next chip 9c in the circumferential direction about the center line C2.

This means that the ultrasonic bonding machine 1 is ready for another ultrasonic bonding, that is, ready for the industrial robot to place two unbonded aluminum alloy plates W1 on the anvil 3, after the industrial robot removes the bonded aluminum alloy plates W1 from the anvil 3.

After the ultrasonic bonding described above has repeated predetermined times, the ultrasonic bonding machine 1 turns to a chip polishing mode to polish the chips 9c. Specifically, the elevator 5 raises the horn 9, which is being vibrated by the vibration unit 7, until the chip 9c located at the top of the horn 9 comes into contact with the removal section 10e of the copper belt 10d as shown in FIG. 5. The slide member 10a slides upward against the biasing force of the coil spring 10b, so that the removal section 10e polishes the chip 9c located at the top of the horn 9 to remove deposits adhering to the surface of the chip 9c.

After the completion of the deposit removal by the removal section 10e, the horn 9 is lowered by the elevator 5 until the horn 9 is located in between the deposit removing unit 10 and the anvil 3, where the horn 9 is stopped. At this moment, the slide member 10a is slid downward by the biasing force of the coil spring 10b, and returns to the original position.

After that, the drive roller 10c is rotated to move the copper belt 10d in an M1 direction by a predetermined amount, as shown in FIG. 2, so that the region of the copper belt 10d serving as the removal section 10e is replaced with a new region which has not yet undergone the polishing process.

As described above, according to the embodiment of the present disclosure, surfaces of the chips 9c used for ultrasonic bonding can be periodically polished by the deposit removing unit 10 capable of removing deposits, which reliably prevents or reduces the fixture of the aluminum alloy plates W1 to the chips 9c in the ultrasonic bonding. Since the deposit removing unit 10 is positioned above the horn 9, the entire ultrasonic bonding machine 1 has a smaller horizontal size, thereby requiring no large site for installation. Further, the chip 9c can be moved to a polishing position, where the surface of the chip 9c is polished, by utilizing the upward movement of the elevator 5 used during ultrasonic bonding; and the surface of the chip 9c can be polished by utilizing the vibrations of the vibrating unit 7 used during ultrasonic bonding. It is therefore not necessary to provide additional mechanisms intended for movement and polishing of the chips 9c in polishing the surfaces of the chips 9c. That is, no additional cost is required to polish the surfaces of the chips 9c.

The positions of the chips 9c are changed by simply rotating the horn 9 about the center line C2 by the rotary motor 8, without vertically changing the position of horn 9. Thus, the ultrasonic bonding machine 1 requires only a small vertical size.

In replacing the chip 9c having deposits on its surface with another chip 9c not yet having deposits on its surface, no complicated operation is needed, such as attachment/detachment of the chips 9c to/from the horn 9 by an operator. That is, the chips 9c are easily replaced.

When the elevator 5 raises the horn 9, and the chip 9c located at the top of the horn 9 comes into contact with the copper belt 10d, the slide member 10a slides upward against the biasing force of the coil spring 10b, with the copper belt 10d kept in contact with the surface of the chip 9c due to the biasing force of the coil spring 10b. This configuration can reduce an impact when the chip 9c comes into contact with the copper belt 10d, and hence can reduce malfunctions of the ultrasonic bonding machine 1.

After polishing the surface of the chip 9c, the drive roller 10c is actuated to move the copper belt 10d by a predetermined amount between the drive roller 10c and the slide member 10a. As a result, a new region of the copper belt 10d which has not yet undergone the polishing process is positioned below the slide member 10a. This configuration allow each chip 9c to be polished with the copper belt 10d in a region having a good surface condition, which makes it possible to reliably remove deposits adhering to the surface of the chip 9c.

Although in the embodiment of the present disclosure, four chips 9c are provided at regular intervals around the center line C2 of the horn 9, two or three chips 9c may be provided at regular intervals around the center line C2 of the horn 9. Alternatively, five or more chips may be provided. If an even number of the chips 9c are provided at regular intervals around the center line C2 of the horn 9, one of the chips 9c is located at the bottom of the horn 9, and one of the rest of the chips 9c is located at the top of the horn 9. Ultrasonic bonding is carried out using the chip 9c located at the bottom of the horn 9 lowered by the elevator 5 while being vibrated by the vibration unit 7. Polishing is carried out thereafter with respect to the chip 9c located at the top of the horn 9 raised by the elevator 5 while being vibrated by the vibration unit 7. This configuration allows efficient bonding and polishing.

In the embodiment of the present disclosure, deposits adhering to the chips 9c are removed by the endless copper belt 10d, but the configuration is not limited thereto. The deposits may be removed with an endless sandpaper belt, for example.

In the embodiment of the present disclosure, the copper belt 10d for removing deposits are moved in a circumferential direction, but it is not essential to move the belt in the circumferential direction.

The present disclosure is suitable for an ultrasonic bonding machine configured to bond two bonding targets, which are overlapped with each other, by ultrasonic vibrations.

What is claimed is:

1. An ultrasonic bonding machine comprising:
   a horn provided with a chip for bonding located at a bottom of the horn;
   a vibrator which horizontally vibrates the horn;
   an elevator which raises and lowers the horn;
   an anvil arranged below the horn and allowing two bonding targets to be placed thereon, with the two bonding targets overlapping each other; and
   a chip position changer configured, via rotation of the horn, for changing a position of the chip to a position at a top of the horn,
   wherein:
      the vibrator vibrates the horn and the elevator lowers the horn, so that the anvil and the vibrating chip sandwich, and ultrasonically bond, the bonding targets,
      a deposit remover is provided above the horn,
      when the horn is vibrated by the vibrator and raised by the elevator, the chip, positioned at the top of the horn by the chip position changer, comes into contact with the deposit remover, with the chip being vibrated to allow the deposit remover to remove a deposit adhering to the chip,
      the horn is configured to move to: a contact position at which the horn comes into contact with the bonding targets, a switching position at which a position of the chip is switched, and a deposit removal position at which the horn comes into contact with the deposit remover,
      the horn is located in the switching position when raised from the contact position, and
      the horn is located in the deposit removal position when raised from the switching position.

2. The ultrasonic bonding machine of claim 1, wherein:
   the chip position changer is a rotary motor, which rotates the horn about a center line of the horn extending horizontally.

3. The ultrasonic bonding machine of claim 2, wherein:
   the chip comprises a plurality of chips arranged at regular intervals around the center line of the horn.

4. The ultrasonic bonding machine of claim 3, wherein:
   an even number of the chips are provided around the center line of the horn.

5. The ultrasonic bonding machine of claim 1, further comprising:
   a deposit removing member including a removal section which removes the deposit adhering to the chip;
   a slide member which is placed above the removal section so as to be in contact with the removal section and which is vertically slidable; and
   a biasing member which biases the slide member downward.

6. The ultrasonic bonding machine of claim 5, wherein:
   a drive roller having a horizontally extending rotation axis is provided above the biasing member; and
   the deposit removing member is an endless belt wound around the drive roller and the slide member so as to be circularly movable.

7. The ultrasonic bonding machine of claim 6, wherein:
   when the deposit remover removes the deposit on the chip, the drive roller is stopped, and
   after removing the deposit on the chip and positioning the horn at the switching position, the drive roller is actuated to move the deposit remover.

* * * * *